March 15, 1955
J. A. MEAD ET AL
2,703,935
RATE OF TURN INDICATOR
Filed March 6, 1952
2 Sheets-Sheet 1
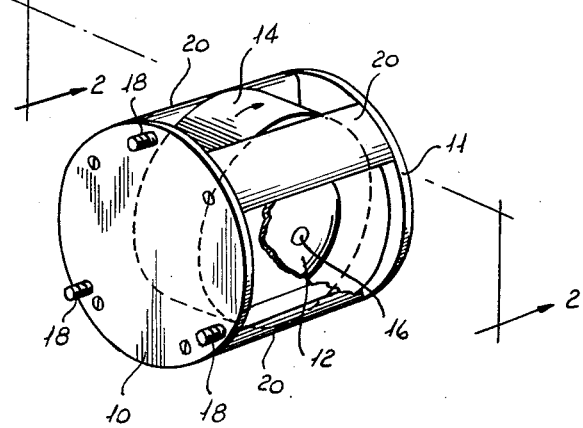
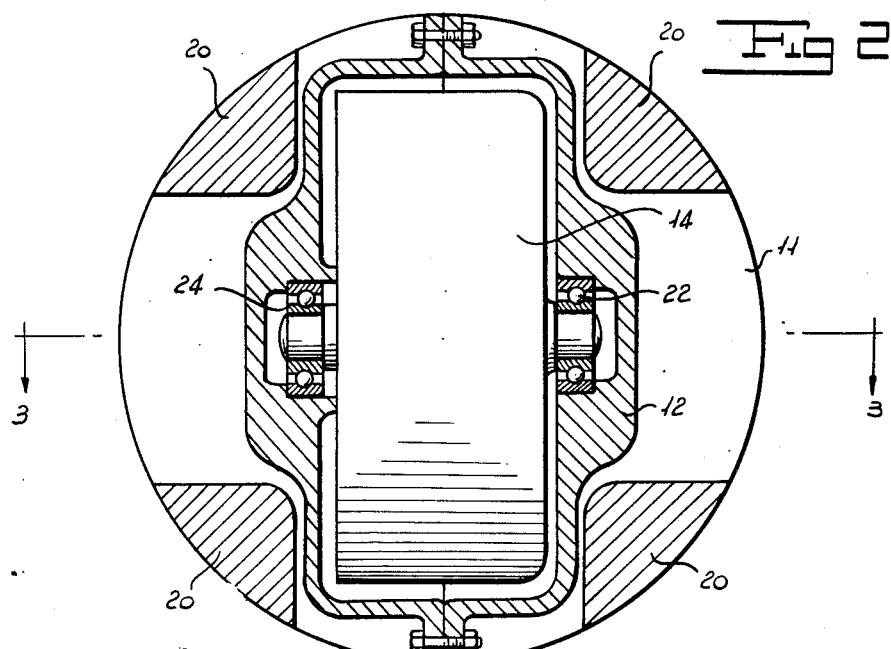
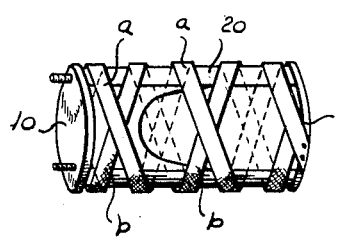
INVENTORS
JOHN A. MEAD
JAMES C. MATHIESEN
BY
Henry L. Shevier
ATTORNEY March 15, 1955 J. A. MEAD ET AL 2,703,935
RATE OF TURN INDICATOR
Filed March 6, 1952 2 Sheets-Sheet 2
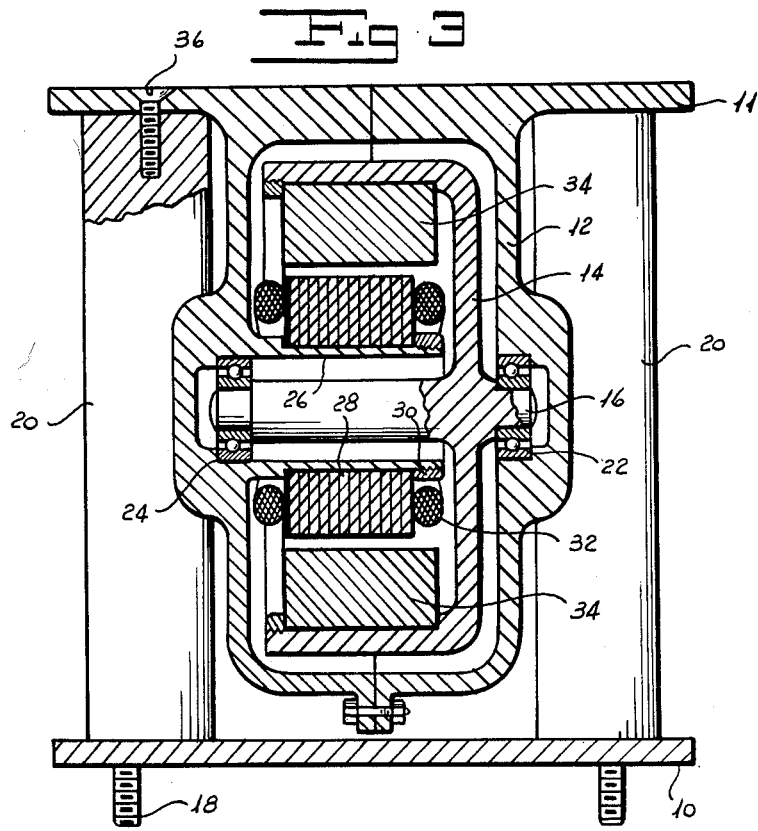
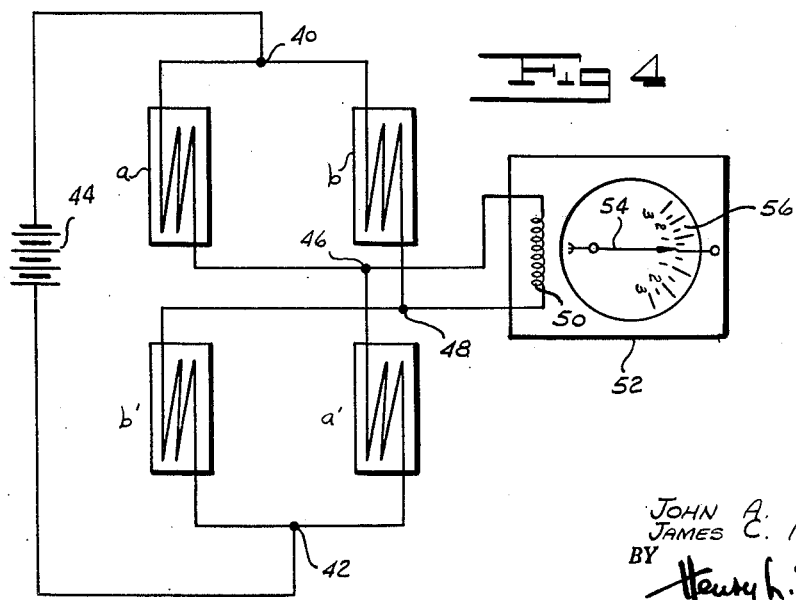
INVENTORS
JOHN A. MEAD
JAMES C. MATHIESEN
BY
Henry L. Shenier
ATTORNEY

United States Patent Office 2,703,935
Patented Mar. 15, 1955

2,703,935

RATE OF TURN INDICATOR

John A. Mead, Croton-on-Hudson, and James C. Mathiesen, Pleasantville, N. Y., assignors to The Norden Laboratories Corporation, White Plains, N. Y., a corporation of Connecticut Application March 6, 1952, Serial No. 275,138

2 Claims. (Cl. 33—204)

Our invention relates to a rate of turn indicator and more particularly to a gyroscopic device adapted to be mounted on an aircraft to show the rate at which the aircraft is changing course, that is, turning about a vertical axis.

It is important for the pilot of an aircraft to know the rate at which he is turning when flying on instruments. The rate of turn will indicate the turning radius, that is, whether the aircraft is maneuvering in a large or small circle. This is of paramount importance in instrument flying in traversing a predetermined flight pattern.

One object of our invention is to provide a rate of turn indicator of increased sensitivity.

Another object of our invention is to provide a compact rate of turn indicator having a high speed of response in measuring angular velocity.

Another object of our invention is to provide a compact and efficient measuring arrangement for measuring rate of turn.

Other and further objects of our invention will appear from the following description.

In general, our invention contemplates the mounting of a gyroscope with its spin axis horizontal in a support adapted in flex in response to precessional forces resulting from the angular rotation about a vertical axis perpendicular to the spin axis. Strain gauges are arranged to measure this precessional force which is used as a direct indication of the rate of turn.

In the accompanying drawings which form part of the instant specification and which are to be read in conjunction therewith and in which like reference numerals are used to indicate like parts in the various views:

Figure 1 is a diagrammatic view of the flexible support and gyroscope forming part of our assembly.

Figure 2 is a sectional view drawn on an enlarged scale taken along the line 2—2 of Figure 1.

Figure 3 is a sectional view taken along the line 3—3 of Figure 2.

Figure 4 is a diagrammatic view showing the electrical network in which the strain gauges employed in our invention are connected.

Figure 5 is a perspective view showing the mode of mounting the strain gauges on the flexible support in which the gyroscope is housed.

In general our invention contemplates the provision of a flexible housing adapted to yield torsionally in response to precessional forces derived from a gyroscope having a horizontal spin axis during a turning movement or angular rotation about a vertical axis. Within the flexible support we mount a gyroscope having a horizontal axis, one end of the flexible support carrying the gyroscope and the other end of the flexible support being secured to the aircraft. Strain gauges are wrapped around the flexible support in a network such that torsional movement of the support in either direction is measured as an indication of the rate of turn. Other movements of the support around horizontal or vertical axes, or both, produce changes in resistances of the strain gauges such that no unbalance of the bridge network occurs.

More particularly referring now to Figure 1, the flexible support comprises a base plate 10 and an end plate 11. The end plate 11 is formed integral with a gyroscope housing 12. If desired, the gyroscope housing may be separately formed and secured to the end plate 11. Within the housing a gyroscope rotor 14 is mounted on a horizontal shaft 16. The base plate 10 is secured by means of bolts 18 to any suitable portion of an aircraft. The end plate 11 is connected to the base plate 10 by means of longitudinal members 20. It will be readily apparent that as the aircraft turns about a vertical axis the gyroscope rotor 14 will exercise a precessional force placing a stress upon the end plate 11 attempting to rotate it around a fore-and-aft axis. This torsional stress will be relieved, in part, by the rotary motion of the end plate permitted by the inherent flexibility of the longitudinal members 20.

Figure 1 is a diagrammatic view and the construction can better be seen by reference to Figures 2 and 3, in which the end plate 11 is formed integral with the gyroscope housing 12. Within the gyroscope housing we mount the rotor 14, having a shaft 16 lying along the spin axis. The shaft is supported in ball bearings 22 and 24. The housing 12 is formed with a tubular central member 26 through which the shaft 16 extends. Annular core laminations 28 are disposed about the tubular member 26 and clamped in position by a nut 30. The field windings 32 of the gyroscope motor are disposed about the core 28. The rotor 14 carries blades 34 forming the inductors of a squirrel cage motor which coact with the rotating magnetic field created by the windings 32. This is well known to the art and hence will not be described in detail. It is in this manner that the gyroscope rotor 14 is driven. It is to be understood that advantageously the gyroscope rotor may be made of tungsten or some other heavy metal in order to increase the moment of inertia of the rotor. The end plate, which in this instance is formed integral with the housing, is secured by means of screws 36 to the longitudinal flexible members 20. The other ends of the flexible members 20 are similarly secured to the base plate 10.

Reference is now had to Figure 4, from which it will be observed that a strain gauge indicated by the reference character $a$ is connected in a Wheatstone bridge along with strain gauges $b$, $a'$ and $b'$. One pair of terminals of the bridge is comprised by the point 40 between the ends of strain gauges $a$ and $b$ and by the point 42 between the ends of strain gauges $b'$ and $a'$. These terminals of the bridge are connected across a voltage source such as the battery 44. The point 46 between strain gauges $a$ and $a'$ and the point 48 between the strain gauges $b$ and $b'$ form the other terminals of the bridge. These terminals are connected across the input coil 50 of the galvanometer 52. This galvanometer is provided with a pointer 54 coacting with a scale 56 which may be advantageously calibrated in units indicating rate of turn, such as degrees per second, degrees per minute, or the like. The arrangement is such that a deflection of the pointer to the right will indicate a right-hand turn and a deflection of the pointer to the left will indicate a left-hand turn. It is to be understood that any suitable indicator known to the art may be employed to utilize the output of the bridge, provided it is responsive both in amplitude and in direction.

The strain gauges are well known to the art. They comprise flexible members in which are imbedded or otherwise suitably secured lengths of a conductor which changes its resistance in response to stresses imposed upon it. Examples of such conductors are wires made of Cupro-nickel alloy. The flexible strain gauge $a$ is wound around the flexible support members 20 in a counter-clockwise direction viewed from the right, while the strain gauge $b$ is wound around the flexible longitudinal members 20 in a clockwise direction viewed from the right. This can be readily seen by reference to Figure 5. The ends of the strain gauges are suitably secured, respectively, to the end plate 11 and the base plate 10, it being understood that the flexible strain gauges are wound tautly. The resistances $b'$ and $a'$ are similarly wound in opposite directions and connected in the bridge network shown in Figure 4. If desired, the resistances $b'$ and $a'$ may be fixed resistors and reliance had only upon strain gauges $a$ and $b$.

In the operation of our assembly let us assume that the rotor 14 is rotating in the direction of the arrow shown in Figure 1 and that a right-hand turn is performed by an aircraft on which our assembly is mounted. The right-hand end of the horizontal axis 16 will tend to elevate due to the precessional force exercised by the gyroscope incident to this rotation about a vertical torque axis. In other words, the spin axis of the gyroscope will tend to align itself with the torque axis. This will twist the end plate 11, viewed from the right in Figure 1, in a clockwise direction, thus stretching strain gauge $b$, as seen in Figure 5, and loosening strain gauge $a$. This unbalances the bridge in one direction, and the amount of the unbalance increases or decreases as the difference in resistances of strain gauges $a$ and $b$ increases or decreases, respectively. This in turn increases or decreases proportionally to the twisting of the end plate 11 which we have shown varies as the rate of turn. Accordingly, the current measured by the galvanometer flowing through coil 50 will be a direct measure of the rate of turn. If the turn is to the left, the opposite action takes place.

Since the longitudinal members 20 are free and there is vibration in the aircraft the end plate 11 will move up and down and from side to side. Motions of this sort will vary the resistance of strain gauges $a$ and $b$ equally and in the same sense. An increase or decrease in the resistances of $a$ and $b$ of equal magnitude will not unbalance the bridge. Accordingly, all strains, except torsional strains, will be balanced out. These strains would be occasioned not only by vibration but also by inertia of the end plate and its attached masses. In other words, if an aircraft should accelerate suddenly, strain gauges $a$ and $b$ would tend to decrease in resistance. The decrease, however, would be equal on opposite sides of the bridge and thus cancel each other and not affect the bridge to unbalance it.

It will be seen that we have accomplished the objects of our invention. We have provided a rate of turn indicator of great sensitivity and having an exceedingly high speed of response which is adapted to measure angular velocity directly. Our arrangement is quite compact in that the flexible members around which the strain gauges are wrapped form a cage in which the gyroscope housing is positioned. We thus have a small, compact, sensitive rate of turn indicator having an exceedingly high speed of response.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A rate of turn indicator, a support torsionally flexible about its longitudinal axis, means for mounting one end of the support on a movable carrier with its longitudinal axis substantially parallel to the axis of the carrier, a gyroscope housing, a gyroscope rotor having a spin axis mounted in the housing, means for carrying the housing from the other end of the support with the spin axis of the rotor substantially horizontal and extending substantially at right angles to the longitudinal axis of the support whereby the support will flex torsionally in response to precessional forces generated by the gyroscope incident to the angular movement of the support about a vertical axis, and means for measuring the direction and amount of the movement of the gyroscope housing about the torsional axis of the support as an indication of the rate of turn, said support comprising a pair of substantially vertical plates and a plurality of parallel flexible members secured to the plates adjacent their ends whereby the plates of the flexible members form a cage, said gyroscope housing positioned within said cage.

2. A rate of turn indicator, a support torsionally flexible about its longitudinal axis, means for mounting one end of the support on a movable carrier with its longitudinal axis substantially parallel to the axis of the carrier, a gyroscope housing, a gyroscope rotor having a spin axis mounted in the housing, means for carrying the housing from the other end of the support with the spin axis of the rotor substantially horizontal and extending substantially at right angles to the longitudinal axis of the support whereby the support will flex torsionally in response to precessional forces generated by the gyroscope incident to the angular movement of the support about a vertical axis, and means for measuring the direction and amount of the movement of the gyroscope housing about the torsional axis of the support as an indication of the rate of turn, said means for measuring the direction and amount of the movement of the gyroscope housing about the torsional axis of the support including a Wheatstone bridge, one arm of the bridge being formed of a flexible strain gauge, another arm of the bridge being formed of a second flexible strain gauge, one of said strain gauges being wrapped around the support in one direction and the other of the strain gauges being wrapped around the support in the reverse direction whereby torsional flexing of the support in one direction will increase the resistance of one of the strain gauges and torsional flexing of the support in the other direction will increase the resistance of the other of said strain gauges, means for impressing a potential across one pair of terminals of the bridge, and means responsive to the unbalance of the bridge connected across the other pair of terminals of the bridge for indicating the direction and rate of turn.

References Cited in the file of this patent

UNITED STATES PATENTS

| | | |
|---|---|---|
| 2,435,231 | McPherson | Feb. 3, 1948 |
| 2,479,122 | Konet | Aug. 16, 1949 |
| 2,484,823 | Hammond | Oct. 18, 1949 |